United States Patent [19]
Lagarelli

[11] 3,879,064
[45] Apr. 22, 1975

[54] COMBINATION COUPLING

[75] Inventor: Carmen J. Lagarelli, New Castle, Del.

[73] Assignee: Speakman Company, Wilmington, Del.

[22] Filed: Jan. 22, 1973

[21] Appl. No.: 325,627

[52] U.S. Cl. .................. 285/12; 285/287; 285/386
[51] Int. Cl. ............................................. F16l 25/00
[58] Field of Search ............ 285/12, 287, 386, 354, 285/177, 169

[56] References Cited
UNITED STATES PATENTS

| | | | |
|---|---|---|---|
| 2,089,784 | 8/1937 | Cornell, Jr. | 285/169 |
| 2,574,182 | 11/1951 | Hickman et al. | 285/169 |
| 2,824,756 | 2/1958 | Wagner | 285/12 |
| 3,056,616 | 10/1962 | Jaros | 285/177 |
| 3,126,212 | 3/1964 | Young | 285/12 |
| 3,567,175 | 3/1971 | Sciuto, Jr. | 285/12 |
| 3,649,050 | 3/1972 | Woodling | 285/12 |

*Primary Examiner*—Werner H. Schroeder
*Attorney, Agent, or Firm*—Connolly & Hutz

[57] ABSTRACT

Ground joint coupling includes combination inlet swivel comprising cylindrical sleeve with opposite open ends. Annular outwardly extending beveled projection is provided on exterior of sleeve approximately midway between opposite open ends thereof, an annular beveled projection divides sleeve into first and second portions. First sleeve portion has smooth-walled interior surface for sweat connection of tubing thereto while second sleeve portion has threaded interior surface for connection of threaded pipe thereto.

3 Claims, 5 Drawing Figures

PATENTED APR 22 1975 3,879,064
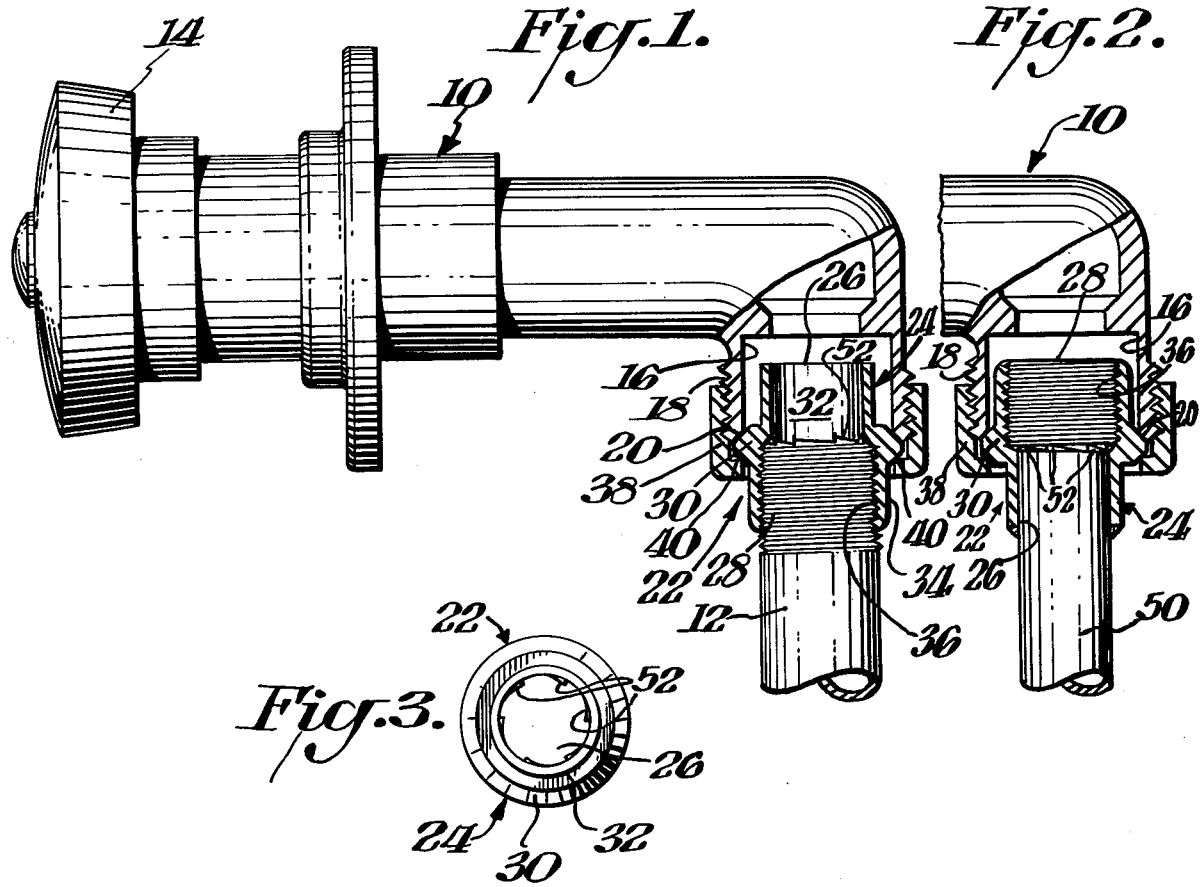
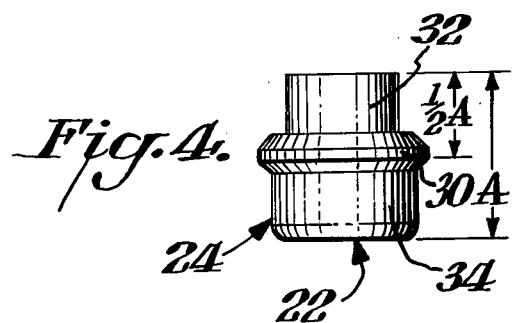
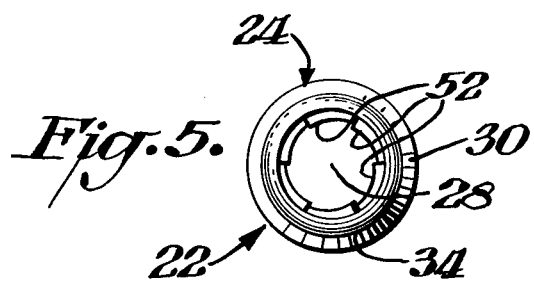

3,879,064

COMBINATION COUPLING

BACKGROUND OF THE INVENTION

The present invention relates to a coupling, and more particularly to a combination coupling wherein externally threaded pipe or smooth-walled tubing may be connected thereto.

In any plumbing system, valves of one type or another must be connected to water pipes and tubes. When threaded pipe is utilized in the plumbing system, a fitting is often threaded onto the end pipe, and this fitting cooperates with the inlet portion of the valve in connecting the pipe to the valve. On the other hand, when smooth-walled copper tubing is used in the plumbing system, a different fitting is required, and the tubing is sweated to that fitting. Here again, the fitting cooperates with the inlet portion of the valve for connecting the tubing to the valve. When the valve is sold without knowing whether threaded pipe or smooth-walled tubing will be connected thereto, it is necessary that two separate and distinct fittings be provided with the valve. The first fitting has internal threads so that threaded pipe can be connected to the valve, while the second fitting has a smooth interior surface for connecting tubing thereto. Even if the purchaser specifies either a threaded pipe connection or a smooth-walled connection, the wholesaler and/or plumbing contractor must inventory both types of fittings. The disadvantages of such a system are obvious.

Young U.S. Pat. No. 3,126,212, granted Mar. 24, 1964, goes a long way in solving the problems discussed above. Young describes a combination connection wherein either threaded pipe or smooth-walled tubing may be connected to a single coupling piece. However, with the Young connection, both the threaded pipe and the smooth-walled tubing are inserted into the same end of the coupling piece. When threaded pipe is used it traverses about one-half of the coupling. On the other hand, when copper tubing is utilized it traverses just about the entire length of the coupling. Hence, the line running to the valve of Young must be longer when copper tubing is used in comparison to a shorter line when threaded pipe is used. Such an arrangement tends to complicate the planning stages since long lines are required when copper tubing is run while shorter lines are used when threaded pipe is run. Different sets of plans are therefore required depending on the type of conduit used.

SUMMARY OF THE INVENTION

Accordingly, it is an object of the present invention to provide a unique and simple coupling that includes a combination inlet swivel capable of connecting either threaded pipe or smooth-walled tubing to the valving arrangement of a plumbing system.

Another object of the present invention is to provide a coupling that includes a combination inlet swivel wherein threaded pipe or smooth-walled tubing may be connected to the swivel with the length of the pipe or tubing running thereto being substantially the same.

In accordance with the present invention, a combination inlet swivel for a ground joint coupling comprises a cylindrical sleeve with opposite open ends. An annular outwardly extending beveled projection is located on the exterior of the sleeve between the opposite ends thereof. The annular beveled projection divides the sleeve into first and second portions, the first portion having a smooth-walled interior surface for sweat connection of tubing thereto. The second portion of the cylindrical sleeve has a threaded interior surface for connection of threaded pipe thereto.

Preferably, the beveled projection is located on the sleeve approximately midway between the opposite ends thereof. Also, the first portion of the cylindrical sleeve has interior stop structure for limiting inward movement of tubing inserted into the open end of the first portion. Also, the first portion of the cylindrical sleeve has an exterior diameter which is less than the exterior diameter of the second portion of the sleeve.

The combination inlet swivel for the ground joint coupling of the present invention is preferably utilized with valve structure having an inlet portion with exterior threads thereon. A coupling nut cooperates with the exterior threads on the inlet portion of the valve structure. The annular beveled projection of the inlet swivel is constructed and arranged to engage the end of the inlet portion of the valve structure when the swivel is inserted into the inlet of the valve. The coupling nut includes a shoulder portion that engages the annular beveled projection of the inlet swivel when the nut is tightened onto the exterior threads of the inlet portion of the valve structure so that the annular beveled projection is secured between the end of the inlet portion and the shoulder of the coupling nut.

BRIEF DESCRIPTION OF THE DRAWING

Novel features and advantages of the present invention in addition to those mentioned above will become apparent to those skilled in the art from a reading of the following detailed description in conjunction with the accompanying drawing wherein similar reference characters refer to similar parts and in which:

FIG. 1 is a side elevational view of a valve with a threaded pipe connected thereto according to the present invention, portions being broken away to show detail;

FIG. 2 is a fragmental side elevational view similar to FIG. 1 with a smooth-walled tube connected to the valve;

FIG. 3 is a top plan view of the combination coupling according to the present invention;

FIG. 4 is a side elevational view of the combination coupling according to the present invention; and FIG. 5 is a bottom plan view of the combination coupling according to the present invention.

DETAILED DESCRIPTION OF THE INVENTION

Referring in more particularity to the drawing, FIG. 1 illustrates valve structure 10 connected to a threaded pipe 12. The particular valve structure shown in FIG. 1 is a compression type valve and includes a handle or operator 14 for adjusting the volume. Single handle valve designs may also be used wherein the volume is controlled by reciprocating the operator and the temperature is controlled through rotation of the operator. Continuing, the valve structure 10 includes an inlet portion 16 with exterior threads 18 thereon. The inlet portion 16 of the valve structure 10 has a bevel section 20 that functions to provide a liquid-tight seal, as explained more fully below.

FIG. 1 further illustrates a combination inlet swivel 22 for a ground joint coupling. The inlet swivel comprises a cylindrical sleeve 24 with opposite open ends 26, 28. An annular outwardly extending beveled projection 30 is located on the exterior of the sleeve 24 between the opposite open ends 26, 28. The annular beveled projection 30 divides the sleeve into first and second portions, 32 and 34, respectively. The first portion 32 has a smooth-walled interior surface for sweat connection of tubing thereto, as described more fully below. The second portion 34 has interior threads 36 for connection of threaded pipe thereto.

Preferably, the beveled projection 30 is located on the sleeve 24 approximately midway between the opposite ends thereof. Also, the beveled projection is located on the sleeve 24 about opposite the juncture of the smooth-walled and threaded interiors of the first and second portions 32, 34.

In the orientation shown in FIG. 1, the threaded pipe 12 is connected to the valve structure 10. In this regard, the pipe 12 is threaded into the second portion 34 of the inlet swivel 22, and the swivel is then inserted into the inlet portion 16 of the valve structure 10. One of two bevel sections on the beveled projection 30 engages the bevel section 20 on the inlet portion 16 of the valve structure. Next, a coupling nut 38 is threaded onto the exterior threads 18 of the inlet portion of the valve structure. An annular shoulder 40 of the nut 38 engages the other bevel section of the annular beveled projection 30 of the inlet swivel 22. When the coupling nut 38 is fully tightened on the exterior of the inlet portion 16, the connection of the threaded pipe 12 to the valve structure 10 is completed.

The ground joint coupling results from the interaction of the bevel section 20 and the surface of the beveled projection 30 that engages that section. Also, the coupling nut 38 cooperates with the threads 18 on the inlet portion 16 to urge the projection 30 into intimate engagement with the bevel section 20.

Preferably, the combination inlet swivel 22 and the coupling nut 38 are formed of brass. The nut, for example, may be made by metal casting techniques well known in the art, and then appropriately machined to complete the finished product. The inlet swivel may be machined from brass rod, for example.

FIG. 2 illustrates a portion of the valve structure 10 with smooth-walled tubing 50 connected thereto instead of the threaded pipe 12. The same combination inlet swivel 22 is utilized to connect the tubing 50 to the valve structure 10 but in this case the inlet swivel is oriented with the first portion 32 down instead of up. As is well known, the tubing 50 is sweat connected to the first portion 32 of the inlet swivel 22 after the tubing is matingly inserted into the open end 26 of the swivel. The tubing is inserted into opening 26 until the end of the tubing engages stops 52 located inside the sleeve 24. The stops 52 may be formed with a hex broach, as is well known. Once the tubing 50 is sweat connected to the inlet swivel 22, the swivel is inserted into the inlet portion 16 of the valve structure 10 so that one of the bevel sections of the beveled projection 30 engages the bevel section 20 on the inlet portion 16 of the valve structure. The coupling nut 38 is then threaded onto the exterior of the inlet portion until the shoulder 40 of the nut engages the other bevel section of the annular beveled projection 30. The nut is then fully tightened to complete connection of the tubing 50 to the valve structure 10.

As shown best in FIG. 4, the annular outwardly extending beveled projection 30 is on the exterior of the sleeve 24 approximately midway between the opposite ends 26, 28 of the sleeve. It is preferred that the beveled projection be located at the midpoint of the sleeve 24. In other words, assuming the length of the sleeve has a dimension A, the beveled projection 30 is located a distance ½ A from either end of the sleeve.

The combination inlet swivel 22 of the present invention serves several significant functions. First, either threaded pipe or smooth-walled tubing may be connected to valve structure, such as 10, with a single swivel. The appropriate half of the inlet swivel is utilized depending upon the type of conduit to be connected to the valve structure. Secondly, since the annular beveled projection 30 is located adjacent to the juncture between the smooth-walled and threaded interiors of the sleeve, the length of conduit running to the valve structure 10 is the same regardless of whether that conduit is threaded pipe 12 or smooth-walled tubing 50. In many instances plumbing plans are laid out for a standard home and the type of water conduit is selected from either threaded pipe 12 or tubing 50. In either instance the same plan may be utilized since the plumbing lines have the same length regardless of whether threaded pipe or tubing is selected and used.

What is claimed is:

1. A combination inlet swivel for a ground joint coupling, the inlet swivel comprising a cylindrical sleeve with opposite open ends, a continuous annular outwardly extending beveled projection on the exterior of the sleeve approximately midway between the opposite open ends thereof, the annular beveled projection dividing the sleeve into substantially equal first and second portions, the first portion having a smooth-walled interior surface for sweat connection of tubing and interior stop means for limiting inward movement of tubing inserted therein, the second portion having a threaded interior surface for connection of threaded pipe thereto, the beveled projection being adapted for mating engagement with the inlet portion of a valve when the inlet swivel is oriented for either sweat or threaded connection.

2. A combination inlet swivel for a ground joint coupling as in claim 1 wherein the first portion of the cylindrical sleeve has an exterior diameter less than the exterior diameter of the second portion of the sleeve.

3. A combination inlet swivel for a ground joint coupling as in claim 1 in combination with valve means having an inlet portion with exterior threads thereon, a coupling nut cooperating with the external threads on the inlet portion, the annular beveled projection of the inlet swivel being constructed and arranged to engage the end of the inlet portion of the valve means when the inlet swivel is inserted into the inlet portion thereof, and the coupling nut including a shoulder portion that engages the annular beveled projection of the inlet swivel when the nut is tightened onto the exterior threads of the inlet portion of the valve means whereby the annular beveled projection is secured between the end of the inlet portion of the valve means and the shoulder portion of the coupling nut.

* * * * *